United States Patent
Henry et al.

(10) Patent No.: US 8,776,679 B1
(45) Date of Patent: Jul. 15, 2014

(54) SEMI-AUTOMATIC BALE EJECTION SEQUENCE

(71) Applicant: CNH Canada, Ltd., Saskatoon (CA)

(72) Inventors: James W. Henry, Saskatoon (CA); Christopher A. Foster, Denver, PA (US); Riccardo Morselli, Modena (IT); Kevin M. Smith, Narvon, PA (US); Mark Wileniec, Saskatoon (CA)

(73) Assignee: CNH Industrial Canada, Ltd., Saskatoon (CN)

( * ) Notice: Subject to any disclaimer, the term of this patent is extended or adjusted under 35 U.S.C. 154(b) by 0 days.

(21) Appl. No.: 13/842,032

(22) Filed: Mar. 15, 2013

(51) Int. Cl.
*A01F 15/07* (2006.01)
*A01F 15/08* (2006.01)

(52) U.S. Cl.
USPC ............ 100/2; 100/4; 100/7; 100/43; 100/88; 100/99; 56/341

(58) Field of Classification Search
USPC ................. 100/2, 4, 7, 35, 43, 45, 87, 88, 99; 56/11.9, 341
See application file for complete search history.

(56) References Cited

U.S. PATENT DOCUMENTS

| | | | |
|---|---|---|---|
| 3,748,840 A | 7/1973 | Kanengieter et al. | |
| 4,549,481 A | 10/1985 | Groeneveld et al. | |
| 4,674,403 A | 6/1987 | Bryant et al. | |
| 5,263,410 A | 11/1993 | Olin | |
| 5,557,510 A | 9/1996 | McIntyre et al. | |
| 5,581,976 A | 12/1996 | Underhill | |
| 5,622,104 A * | 4/1997 | Viesselmann et al. | 100/88 |
| 6,272,825 B1 | 8/2001 | Anderson et al. | |
| 6,295,797 B1 | 10/2001 | Naaktgeboren et al. | |
| 6,644,006 B1 | 11/2003 | Merritt et al. | |
| 6,675,561 B2 | 1/2004 | Davis et al. | |
| 6,688,092 B2 | 2/2004 | Anstey et al. | |
| 6,877,304 B1 | 4/2005 | Smith et al. | |
| 7,197,979 B2 | 4/2007 | Derscheid | |
| 7,404,355 B2 | 7/2008 | Viaud et al. | |
| 7,472,649 B1 * | 1/2009 | Derscheid et al. | 100/88 |
| 7,805,914 B2 * | 10/2010 | Smith | 56/10.7 |
| 7,918,158 B2 | 4/2011 | Viaud | |
| 7,937,923 B2 | 5/2011 | Biziorek | |
| 2005/0257513 A1 * | 11/2005 | Smith et al. | 56/341 |
| 2009/0139195 A1 * | 6/2009 | Humbert | 56/10.7 |

* cited by examiner

*Primary Examiner* — Jimmy T Nguyen
(74) *Attorney, Agent, or Firm* — Patrick M. Sheldrake

(57) ABSTRACT

A bale ejection sequence for ejecting a bale from a baler is initiated from an operator command based upon monitored bale ejection factors. A controller implements a timing sequence that is based on a calibration of a cycle timing of a tailgate of the baler. The timing sequence relates to movement of the tractor, a position of the tailgate, and a hydraulic flow rate of fluid to a hydraulic system connected to the tailgate to move the tailgate between a closed position and an open position.

23 Claims, 6 Drawing Sheets

US 8,776,679 B1

SEMI-AUTOMATIC BALE EJECTION SEQUENCE

TECHNOLOGY FIELD

The present invention relates generally to ejecting a bale from a bale chamber, and more particularly to a semi-automatic sequence for the safe and efficient ejection of a bale.

BACKGROUND

For many years agricultural balers have been used to consolidate and package crop material so as to facilitate the storage and handling of the crop material for later use. Usually, a mower-conditioner cuts and conditions the crop material for windrow drying in the sun. When the cut crop material is properly dried, a baler, for example a round baler, travels along the windrows to pick up the crop material and form it into cylindrically-shaped round bales. When the bale has reached a desired size and/or density, a wrapping system wraps the bale to ensure that the bale maintains its shape and density. For example, a net may be used to wrap the bale of crop material. A cutting or severing mechanism may be used to cut the net once the bale has been wrapped. The wrapped bale may be ejected from the baler and onto the ground by raising a tailgate of the baler. The tailgate is then closed and the cycle repeated as necessary and desired to manage the field of cut crop material.

It is desirable to decrease the amount of time involved in the bale ejection process by efficiently controlling the sequence of raising and then lowering the tailgate for the ejection of the bale. It is also desired to have a semi-automatic bale ejection process that relies partially on an operator and partially on a baler control system, thus decreasing operator fatigue in the baling process. This document describes a semi-automatic sequence for the safe and efficient ejection of a bale.

SUMMARY

Embodiments of the present invention provide a semi-automatic bale ejection sequence. According to embodiments, a bale ejection sequence is implemented to eject a bale from a baler, the baler comprising a baling chamber with a tailgate in a rear section of the baling chamber, the tailgate moveable between a closed position and an open position, the baler further comprising a hydraulic system connected to the tailgate to move the tailgate between the closed position and the open position, and a controller connected to a flow valve to control a flow of fluid to the hydraulic system. The controller determines an indication for bale ejection of the bale and controls a timing sequence relating to a position of the tailgate and a hydraulic flow rate of the fluid to the hydraulic system, wherein the timing sequence comprises (i) opening the tailgate while maintaining the hydraulic flow rate at a normal level; (ii) when the tailgate is approaching a near-opened position, proportionately decreasing the hydraulic flow rate from the normal level to a reduced rate; (iii) when the tailgate reaches a calibrated top position, closing the tailgate while maintaining the hydraulic flow rate at a normal level; and (iv) when the tailgate is approaching a near-closed position, proportionately decreasing the hydraulic flow rate from the normal level to a nominal level. The timing sequence is based on a calibration of a cycle timing of the tailgate.

According to an embodiment, the controller monitors ejection factors, wherein the ejection factors comprise one or more of a size of the bale, a wrapping process of the bale, and a ground speed of a tractor connected to the baler. In some embodiments, the indication for bale ejection of the bale comprises a manual command from the operator based upon the monitored ejection factors.

In an embodiment, power take-off from a tractor to the baler is disengaged by the controller during the timing sequence of opening the tailgate while maintaining the hydraulic flow rate at a normal level. In some embodiments, power take-off from the tractor to the baler is engaged by the controller during the timing sequence of when the tailgate is approaching a near-closed position. According to an embodiment, the controller verifies, via a gate switch sensor coupled to the tailgate and in communication with the controller, when the tailgate reaches a closed position; and upon verification of the closed position, the controller decreases the hydraulic flow rate from the nominal level to zero.

In some embodiments, the timing sequence controller by the controller further relates to movement of a tractor connected to the baler. In these embodiments, the timing sequence further comprises resuming movement of the tractor at one of (i) when the tailgate is approaching the near-closed position or (ii) when the tailgate reaches a closed position.

According to an embodiment, the calibration of a cycle timing of the tailgate is based on one or more of: engine RPM of a tractor connected to the baler; the hydraulic system; a target maximum hydraulic speed at opening of the tailgate; a target maximum hydraulic speed at closing of the tailgate; inertia and momentum of the tailgate; and ejection push by the bale leaving the baling chamber. In an embodiment, the controller calculates an anticipated tailgate opening time and an anticipated tailgate closing time based on one or more of the calibration timing, hydraulic rates, the target maximum hydraulic rates, and aggression rates. In an additional embodiment, a determination relating to the tailgate approaching a near-opened position is based upon the anticipated tailgate opening time; and a determination relating to the tailgate approaching a near-closed position is based on the anticipated tailgate closing time.

In an embodiment, the controller further monitors a power take-off (PTO) torque value of a tractor connected to the baler; if the PTO torque value exceeds a predetermined value, the controller disengages power take-off from the tractor to the baler.

In an additional embodiment, upon receipt of a manual stop command from an operator via the operator interface, the controller disables, one or more of: hydraulic flow to the tailgate, tractor movement, and power take-off (PTO) operations of the tractor.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF ILLUSTRATIVE EMBODIMENTS

Embodiments of the present invention relate to a semi-automatic sequence for the safe and efficient ejection of a bale based on a calibrated timing sequence. Embodiments of the present invention are particularly well suited for, but in no way limited to, use with agricultural balers, such as round balers, for example.

Agricultural balers, such as round balers, are well known in the agricultural industry, and the instant invention can be used with substantially any of such machines. Reference is made, for example, to U.S. Pat. Nos. 6,877,304; 6,688,092; 6,644,006; and 6,295,797 that illustrate such balers, the disclosures of which are incorporated herein by reference in their entirety. For illustrative purposes, details of an exemplary round baler in which the features of the present invention may be used are disclosed in and will be described here in part with reference to U.S. Pat. No. 5,581,976, which is also hereby incorporated by reference in its entirety.

Figure 1:
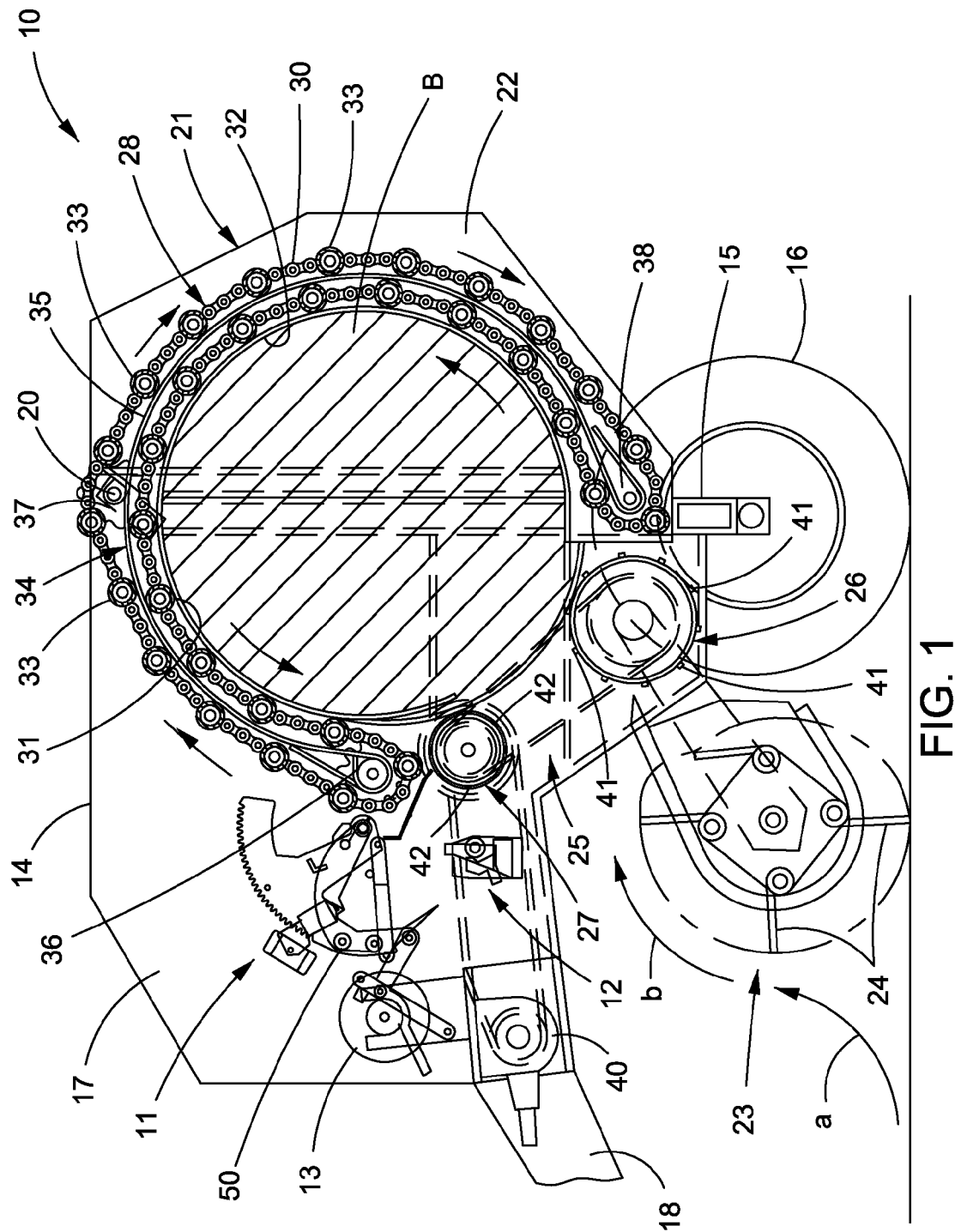
FIG. 1 is a cutaway side elevational view of an exemplary round baler in which the present invention may be employed.

FIG. 1 depicts an exemplary agricultural round baler, generally designated 10, in which embodiments of the present invention may be employed. As previously noted, crop in the field is usually arranged in a windrow as it is engaged by the baler 10 being pulled along the windrow of cut crop material by a tractor (see tractor 100 in FIG. 2).

FIG. 1 shows a fixed chamber round baler 10 having a wrapping system for wrapping a cylindrical package of crop material (not shown) formed in a round baler 10. More particularly, the wrapping system of baler 10 comprises a net dispensing assembly 11 and a cutting assembly 12 for cutting web material, such as net, issued from a supply roll 13.

As shown, round baler 10 includes a main frame 14 with a main support beam 15 on which a pair of wheels 16 (only one shown) are rotatably affixed. The main frame includes a pair of side walls between which a cylindrical bale forming chamber extends. For the purposes of clarity only one wall 17 is shown in FIG. 1 and the elements mounted inwardly thereof are shown in full lines for clarity, which is an approach not uncommon in the descriptions in patents. For illustrative purposes reference letter B is used to designate a bale, shown in cross section in the chamber.

Baler 10 also includes a tongue 18 extending from the forward portion of main frame 14 for conventional connection to a tractor (not shown). Pivotally connected to the sidewalls of main frame 14 by a pair of stub shafts 20 is tailgate 21 which may be closed (as shown in FIG. 1) during bale formation or pivoted open about stub shafts 20 to discharge a completed bale. The tailgate includes tailgate walls 22 coextensive with side walls 17. A pickup assembly 23 mounted on main frame 14 in a suitable manner includes a plurality of fingers or tines 24 moveable in a predetermined path to lift crop material from the ground, generally depicted by direction arrow a, and deliver it rearwardly (arrow b) toward a transverse inlet 25 in the chamber defined by a floor roll 26 and a transverse stripper roll 27, both of which rolls are rotatably supported on mainframe 14 between sidewalls 17.

As shown, the bale forming chamber is defined primarily by an apron assembly 28 comprising a pair of support chains 30 mounted to travel along a continuous path, the inner run of which is defined on sidewalls 17 and tailgate walls 22 by front and rear sections 31, 32 of a continuous chain guide track that separates at a point of track adjacent the stub shaft 20 during bale discharge. The apron further comprises a plurality of parallel tubular crop engaging slats 33 extending between chains 30 to provide a cage-like periphery of the cylindrically shaped chamber. Radially outward of the inner run of apron assembly 28 are front and rear sections 34, 35 of continuous cylindrical bale chamber wall. These sections, also separable during bale discharge, are mounted between side walls 17 and tailgate walls 22, respectively, for maintaining integrity between the outer and inner runs of chain 30. Operatively engaged with chain 30 are drive sprocket 36 mounted between sidewalls 17, idler sprockets 37 also mounted between sidewalls 17 on shaft 20, and idler sprocket 38 mounted between tailgate walls 22. A conventional chain drive system for drive sprocket 36 is provided via appropriate coupling to gearbox 40 in a conventional manner, diagrammatically depicted in phantom outline outwardly of sidewall 17. The bale forming chamber is further defined by the outer conveying surfaces of floor roll 26 and stripper roll 27, both of which are driven in a direction opposite that of the bale chamber direction by conventional drive means appropriately coupled to gear box 40. In FIG. 1, floor roll 26 receives bale material at its forward surface, moving the bale material upward and rearward, clockwise as shown in FIG. 1. Bale material leaves the floor roll 26 and enters the bale chamber which rotates moving the bale material from a lower position, rearward and upward in a circular motion, counterclockwise as shown in FIG. 1. These rolls 26, 27 may be provided with ribs 41, 42 to enhance their ability to convey crops in the chamber as a bale is being formed. Other forms of aggressive surface structure may be used to accommodate various types of crops and conditions.

Figure 2:
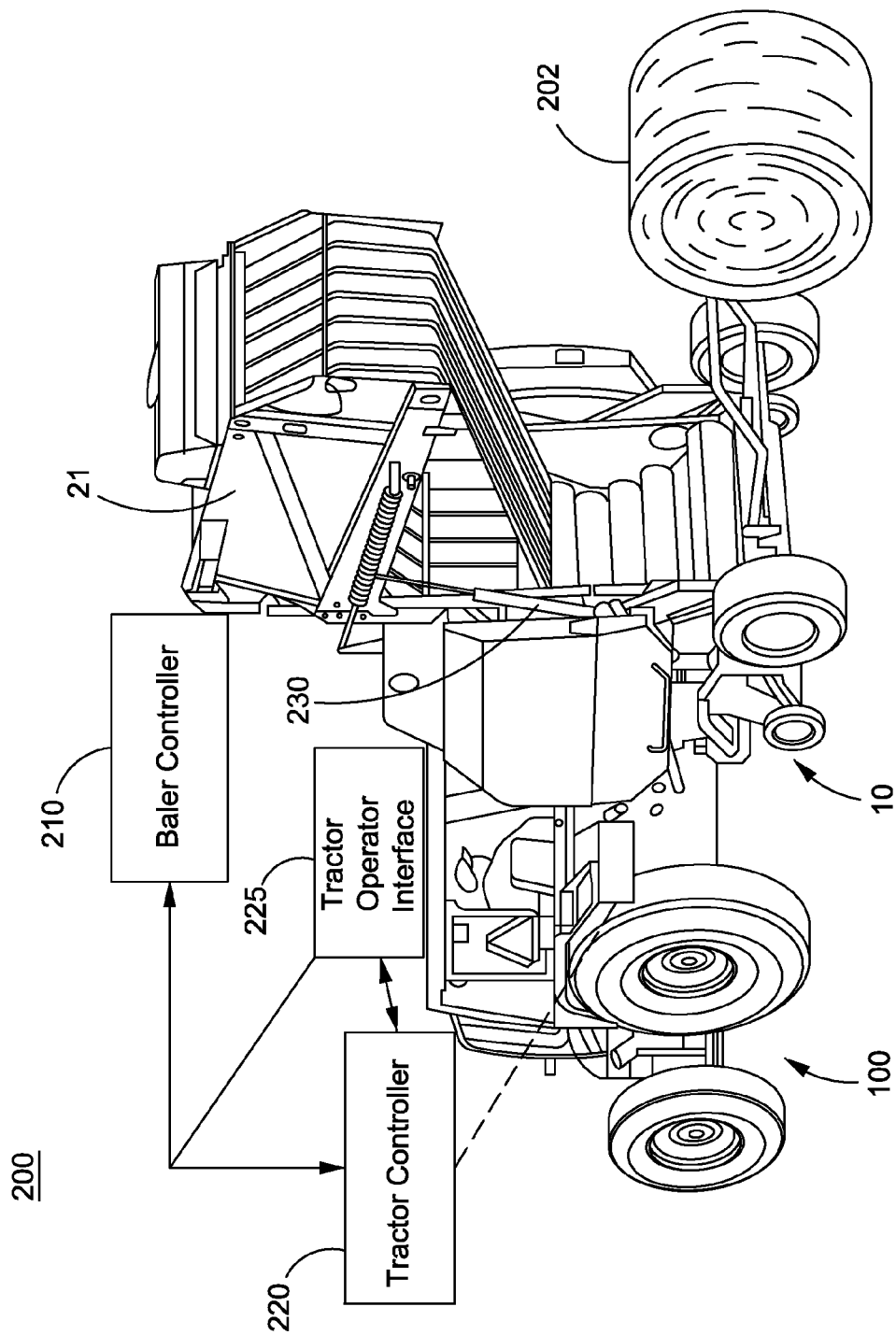
FIG. 2 illustrates a baling system including controllers for implementing a sequence for the ejection of a bale, according to embodiments.

FIG. 2 illustrates a baling system 200, according to embodiments, for performing a bale ejection sequence. The baling system 200 includes the baler 10 with a baler controller 210 and the tractor 100 with a tractor controller 220 and a tractor operator interface 225 accessible by an operator in the tractor 100. The tractor operator interface 225 allows for the operator to see various control and status information as well as to enter and configure information for use by the tractor controller 220 and the baler controller 210. The tractor controller 220 and the baler controller 210 are coupled to one another for messaging and data communication, as further described below. The tractor operator interface 225 is coupled to the tractor controller 220 and may be directly coupled to the baler controller 210 or indirectly through the tractor controller 220.

In other embodiments, the baler 10 is not connected to the tractor 100 but is connected to other equipment, such as, for example, a harvester or a part of a harvester, such as a cotton picker, or the like. In these embodiments, the other equipment (e.g., harvester) may include a controller, similar to the tractor controller 220, and an operator interface, similar to the tractor operator interface 225.

The baling system 200 is used to support semi-automatic round baler ejection of a completed bale 202 with the use of a single gate closed sensor 400 (see FIGS. 4A and 4B), pre-calibrated gate operation timing values, and manual intervention for the triggering of the bale ejection. The single gate closed sensor 400 detects when the tailgate 21 is closed. Proprietary or ISOBUS TECU Class 1 and 3 messaging is used between the tractor controller 220/the tractor operator interface 225 and the baler controller 210 to determine and request operations of the tractor 100 to facilitate bale ejection.

As shown in FIG. 2, the tailgate 21 is in an open position with the bale 202 ejected from the baler 10. In addition to the baler controller 210 and the components described above with reference to FIG. 1, the baler 10 also includes a hydraulic system 230 connected to the tailgate 21 to move the tailgate 21 between the closed position and the open position. The hydraulic system 230, according to an embodiment, may include an actuator and a flow valve. The baler controller 210 is connected to a flow valve to control a flow of fluid to the hydraulic system 230; by controlling a hydraulic flow rate of the fluid to the hydraulic system 230, the baler controller 210 controls opening and closing of the tailgate 21.

Figure 3B:
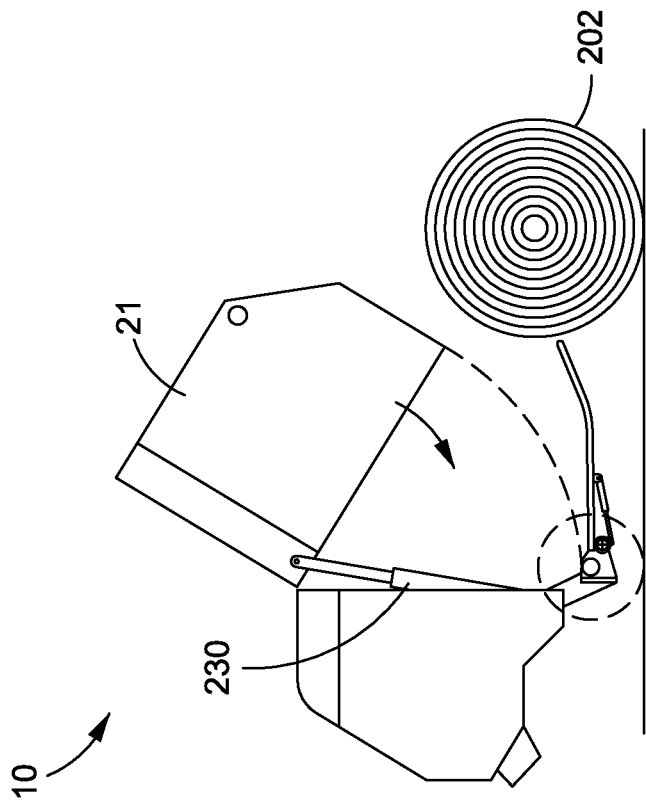
FIGS. 3A and 3B provide side views of a baler 10 with a tailgate in an open position and in a position in which closing of the tailgate has commenced, respectively.
Figure 3A:
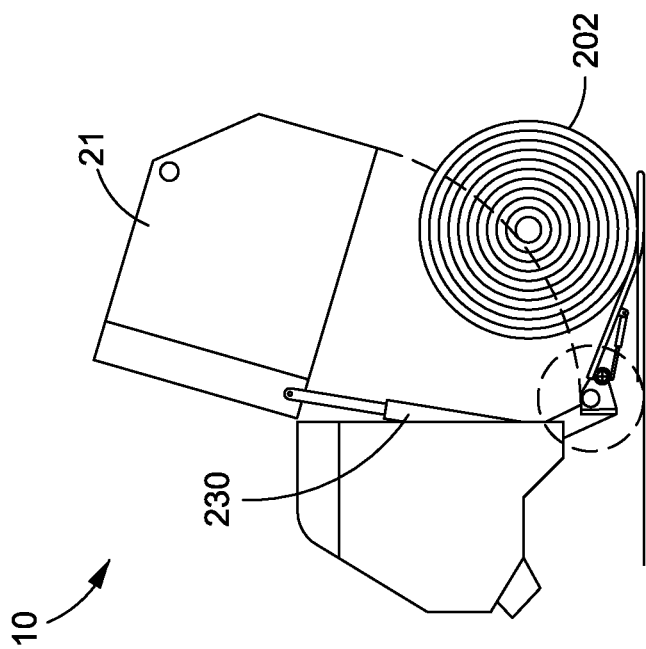

FIGS. 3A and 3B provide side views of the baler 10 (without the tractor 100 or other equipment connected to the baler 10) with the tailgate 21 in an open position and in a position in which closing of the tailgate 21 has commenced, respectively. In FIG. 3A, the bale 202 is completed and the tailgate 21 is in the open position to allow the bale 202 to be ejected. In FIG. 3B, the bale 202 has been ejected in accordance with the bale ejection operations described herein, and closing of the tailgate 21 has commenced.

Figure 4B:
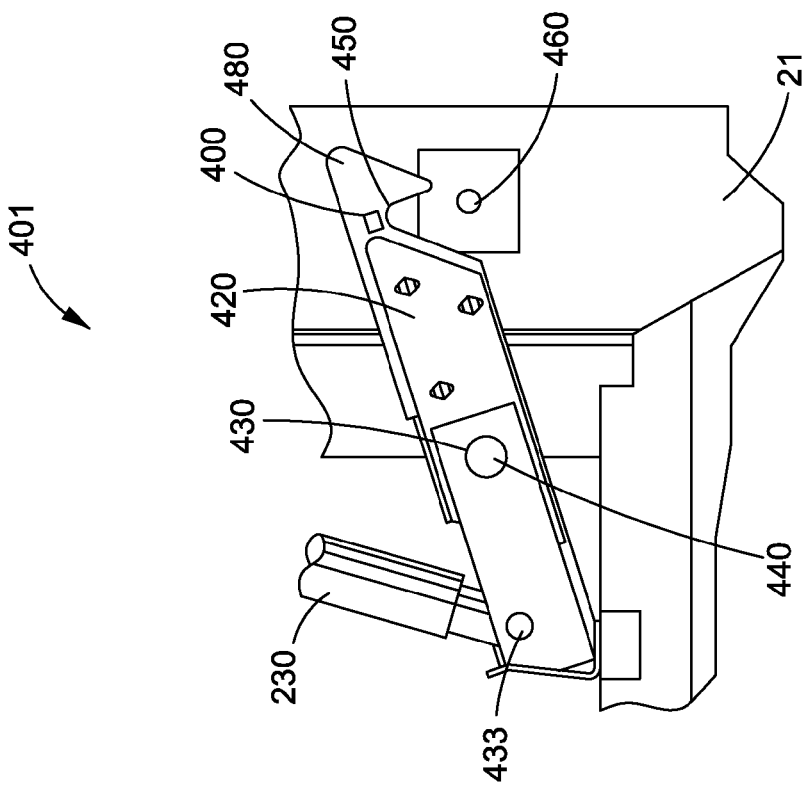
FIGS. 4A and 4B provide an example representation of a latching mechanism, used for detecting when the tailgate of a baler is closed, according to embodiments.
Figure 4A:
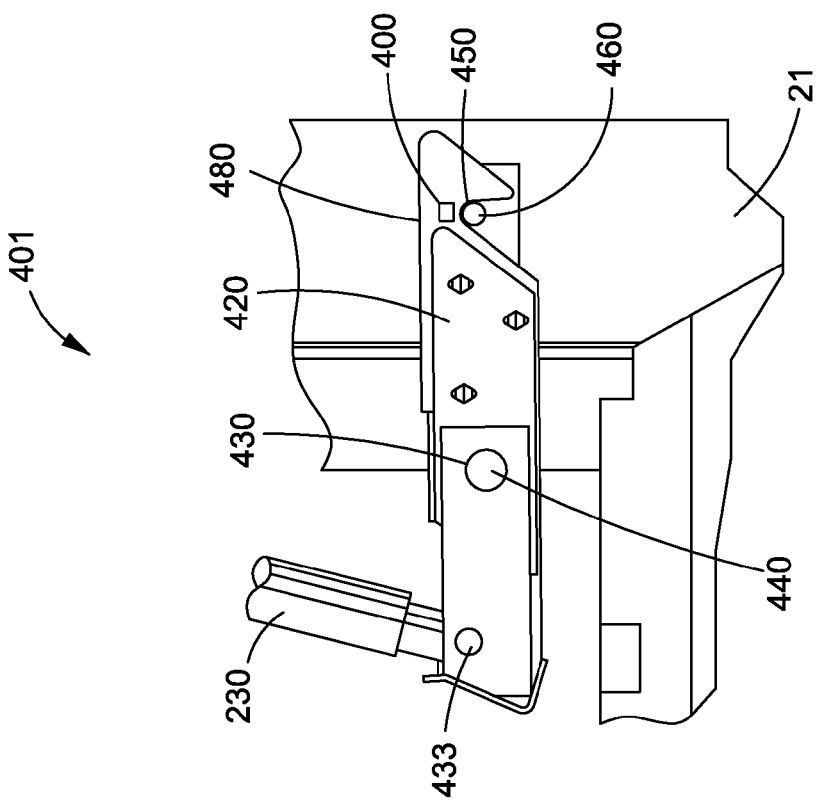

FIGS. 4A and 4B provide an example representation of a latching mechanism 401, used for detecting when the tailgate 21 is closed. The latching mechanism 401 includes a lever arm 420 pivotally coupled to the baler 10 by a pivot point 430 engaging a pivot pin 440 in a manner such that a portion of the lever arm 420 extends in opposing directions from the pivot point 430. One end of the lever arm 420 is pivotally coupled to the hydraulic system 230 using a pin 433. The opposite end of the lever arm 420 is connected to a catch plate 480 which includes an arcuate catch structure 450 featuring a hook-like structure for engaging a latch pin 460 mounted on the tailgate 21. As shown in FIG. 4A, the latching mechanism 401 is in the latched position as it would be during the closed baling chamber condition when the baler 10 is forming a bale 202. FIG. 4B shows the latching mechanism 401 in the unlatched position as it would be when the tailgate 21 is to be raised to discharge the bale 202. A gate closed sensor 400 is provided on the catch plate 480 and senses contact with the latch pin 460 when the tailgate 21 is closed. The gate closed sensor 400 is coupled to the baler controller 210 and accordingly transmits a signal when contact with the latch pin 460 is sensed.

The latching mechanism 401 with the gate closed sensor 400 is one type of mechanism that may be used to detect when the tailgate 21 is closed or at a bottom position; various other mechanisms and sensors may be used for such a detection in accordance with the embodiments of the present invention. For example, in another embodiment, a sensor is used to indicate when the tailgate 21 reaches a bottom position. In this embodiment, a portion of the tailgate 21 comes into contact with the sensor when the bottom position is reached.

Now turning to the operations of the semi-automatic bale ejection, the baling system 200 uses system information and parameters relating to the tractor 100 (or other equipment) and the baler 10 to facilitate the bale ejection operations. The tractor-related and baler-related information and parameters include, but are not limited to, one or more of the following: hydraulic control channel to use for baler ejection operations; minimum ground speed below which bale ejection operations can be performed; operator input selection for the indicator when the bale 202 is completed wrapping and bale ejection can commence; calibration hydraulic flow rate for opening of the baler tailgate 21; calibration hydraulic flow rate for closing of the baler tailgate 21; normal hydraulic flow rate for opening of the baler tailgate 21; normal hydraulic flow rate for closing of the baler tailgate 21; baler tailgate 21 opening speed factor (to control how quickly the tailgate 21 decelerates when nearing the completion of opening); baler tailgate 21 closing speed factor (to control how quickly the tailgate 21 decelerates when nearing the completion of closing); and operator control (via the tractor operator interface 225) to enable/disable the baler semi-automatic ejection control system as performed by the baler controller 210.

The bale ejection sequence relies on a timed calibration of the tailgate 21 opening and closing. There are several factors that affect the timing of the tailgate 21 by the baler controller 210, including: engine RPM; dynamics of the tractor hydraulic system; target maximum hydraulic speed at opening; target maximum hydraulic speed at closing; inertia and momentum of the tailgate 21; and ejection push by the bale as it rolls out of the baler 10. These factors combine to require the careful calibration of the baler controller 210 timing to match the target ejection pattern for a given baler, tractor, and size of bale. During the calibration sequence, the operator is asked to enter the following parameters in a setup screen on the tractor operator interface 225: a target maximum hydraulic speed at opening and target maximum hydraulic speed at closing.

The bale ejection sequence includes calculating the anticipated tailgate 21 opening and tailgate 21 closing times based on the calibration times, the hydraulic rates, the maximum hydraulic rates, and aggression rates.

The operator, via the tractor operator interface 225, may access a "configuration screen" on the tractor operator interface 225 to configure the following parameters: (1) hydraulic channel configuration refers to the hydraulic channel on the tractor 100 connected to the tail gate ejection hydraulics for the baler 10; the operator ensures that the hydraulics are properly connected such that, by using a control in the tractor 100, hydraulic extension opens the tailgate 21 and hydraulic retraction closes the tailgate 21; (2) power take-off (PTO) control configuration allows the baler controller 210 to turn off and on the PTO during the bale ejection sequence; (3) stopped speed configuration identifies the speed below which it is safe to perform tailgate operations; and (4) PTO cutoff torque configuration allows the baler controller 210 to cutoff the PTO should it sense an over-torque situation from the tractor 100.

The automatic tailgate control of the baling system 200 utilizes a timing algorithm or sequence to control position of the tailgate 21 for the bale ejection sequence. The timing sequence is based on the following stages, beginning when the gate closed sensor 400 indicates the tailgate 21 is closed: (1) an initial time zone during which the tailgate 21 is opening; during this initial time zone, the hydraulic system 230 is commanded at the normal hydraulic flow rate for opening; (2) a second time zone during which the tailgate 21 is reaching its fully-opened position; during this second time zone, the hydraulic system 230 is commanded with a proportionally decreasing value from the normal hydraulic flow rate for opening to a reduced rate or a rate of zero; (3) a third time zone during which the tailgate 21 is closing; during this third time zone, the hydraulic system 230 is commanded at the normal hydraulic flow rate for closing; (4) a fourth time zone during which the tailgate 21 is approaching its closed position; during the fourth time zone, the hydraulic system 230 is commanded with a proportionally decreasing value from the normal hydraulic flow rate for closing to a system nominal rate (e.g., a rate sufficient to engage the gate close latching mechanism); and (5) the timing sequence ends when the gate closed indicator 400 indicates the tailgate 21 is closed or when another sensor indicates a bottom position is reached by the tailgate 21; hydraulic flow for tailgate control is set to zero.

During operation of the bale ejection sequence, the baler controller 210 allows for an operator override input to completely cancel automatic ejection operations. Such a cancellation has the effect of stopping all hydraulic flow to a blocked state, leaving the tailgate 21 and other parts of the baler 10 frozen at the state and position when the cancel is commanded. The operator can initiate the cancellation through entry of a command via the tractor operator interface 225, for example.

During normal baling operations, the baler 10 monitors and indicates when the baler 10 is full and ready to wrap and eject a bale 202. The monitoring may be accomplished through one or more sensors in the bale chamber in communication with the baler controller 210. With the semi-automatic bale ejection system, the baler 10 will automatically begin the wrapping sequence once a bale full indication is reached. The operator may also have available a manual control input to initiate bale wrapping and ejection for those cases where the non-full bale is required to be ejected. The operator monitors the bale wrapping sequence and, when satisfied of the bale wrap, uses a manual command input to the baler controller 210 to initiate the bale ejection. In some embodiments, the tractor 100 is stopped during the bale wrapping sequence prior to completion of the bale being wrapped. In some embodiments, the baler 10 will not proceed with bale ejection until the ground speed of the system (i.e., the tractor 100 and the baler 10) is below the configured minimal ground speed or until the tractor 100 is stopped. Once all conditions are met, the baler 10 proceeds to automatically eject the bale 202. As described above, the baler 10, as controlled by the baler controller 210, automatically begins opening the tailgate 21; the baler controller 210 uses the timing determined from the calibration sequence to control the hydraulic flow and will slow down and stop the tailgate 21 when the timing indicates that the tailgate 21 should be at the top target position; once the top target position is reached via the timing algorithm, the baler 10 begins closing the tailgate 21 using the timing determined from the calibration sequence; the baler 10 slows down and stops the tailgate 21 closure based on timing and sensing of the gate closed sensor 400.

Aggression refers to how quickly the tailgate drop will be brought to a slow speed; in some embodiments, a lower value of aggression provides a slower and smoother slowdown of the tailgate 21, while a higher value makes for a more abrupt slowdown. Stopping rate controls the closure hydraulic rate used to positively engage the tailgate latch at the end of the bale ejection sequence (i.e., when the tailgate 21 is closed, the hydraulic flow rate will not drop below this level until the tail gate latch sensor indicates that the tail gate is positively engaged). The stopping rate value also controls the hydraulic rate used during the tailgate drop calibration step.

With respect to the calibration sequence, in one embodiment, the controller 210 is programmed to calculate using an algorithm the flow rates required to achieve at least two different speeds and the transition between the two speeds during both raising and lowering operations. The controller 210 is further programmed to determine the point at which the tailgate 21 transitions between the first and second speed. The point or time at which the transition occurs is determined by an algorithm as a function of the travel time of the baler 10 between a closed an open position determined during calibration and the operator inputted aggression factor. A less aggressive setting will cause the transition between the first and second speeds to occur sooner than a more aggressive setting while a more aggressive setting will cause the transition between speeds to occur more closely to the extent of the travel.

With further reference to the calibration operation, the controller 210 is programmed to calculate the speed between an open position and a closed tailgate position. Algorithm software aims to reduce the flow rate in a near open position and a near closed position, which reduces the acceleration of the mechanical tailgate components, thereby reducing the stress on the mechanical tailgate components, such as cylinders or latching mechanisms. This aggression factor may be based on a fixed flow rate, or calculated based on desired reduction in flow. With a linear rate, the flow rate is slowly reduced to near zero; in a quadratic fashion the flow rate progressively reduces to near zero. This allows the operator to pick the aggression factor.

In another embodiment both the transition time and change in flow can be calculated by the controller 210 as a function of the overall time and the aggression factor.

Additional controls may be incorporated to provide more effective bale ejection control and machine safe operations. One such control is a tractor speed control. The baler controller 210 communicates with the tractor controller 220 to request changes to the speed of the tractor 100 when a bale ejection is required. The baler controller 210 initiates a "stop tractor" command once a full bale 202 is detected and the bale wrap sequence is initiated. The current speed of the tractor 100 may be captured by the baler controller 210 and/or the tractor controller 220 for future reference. Once the operator determines that the bale 202 has been safely ejected, the operator may indicate via a switch command on the tractor operator interface 225 that the baling system 200 may initiate forward tractor movement when the tailgate sequence indicates it is safe to do so; the previously recorded ground speed may be used. Alternatively, without operator input, the baler controller 210 may request resumption of the target ground speed as soon as the gate closing sequence has begun slowing down the tailgate 21 for final closure. If the operator issues a "cancel operations" command, the baler controller 210 requests a speed of zero from the tractor 100.

Another additional control to provide more effective bale ejection control and machine safe operations is tractor power take-off (PTO) control. In some embodiments, the baling system 200 uses the PTO from the tractor 100 to augment the baling process. For machine safety, it is useful to disengage the PTO during bale ejection. The PTO stays engaged during the bale wrapping, disengages during bale ejection, and is re-engaged prior to the forward motion of the tractor 100 to ensure proper pickup for a new bale. To facilitate this, the baler controller 210: issues a PTO speed 0% request of the tractor 100; once the tailgate 21 is near completion of closing after ejection of the bale 202, the PTO is re-engaged with a speed 100% request of the tractor 100. The baling system 200 may provide an operator input to control whether the baler 10 (i.e., the baler controller 210) commands the PTO operations. In some embodiments, the baling system 200 provides an operator input to control the timing for stopping the PTO once the baler tailgate 21 has begun opening. In some embodiments, it may be desired by the operator to continue the PTO operations during the first portion of the tailgate 21 opening to ensure the wrapping is complete while allowing the tailgate 21 to begin opening for an earlier ejection of the bale. The baler controller 210 may automatically re-engage the PTO once the tailgate closing sequence has begun slowing down the tailgate 21 for final closure. The operator may issues a "cancel operations" command, via the tractor operator interface 225, to disengage the PTO.

According to another embodiment, an additional control is tractor PTO over-torque protection. As described above, the baling system 200, in some embodiments, uses the PTO from the tractor 100 to augment the baling process. For machine safety, the baler controller 210 may monitor the tractor PTO torque sensed values to detect an over-torque situation. If an over-torque situation is detected, the baler controller 210 requests a stop of the PTO via the speed 0% request of the tractor 100. The baling system 200 may provide an input to the operator for selecting the level of torque above which the baler controller 210 will request to disengage the PTO.

The baler controller 210 may, in some embodiments, continually monitor for the event of the operator pressing a "cancel" button on the tractor operator interface 225. When this signal is received, the baler controller 210 disables all operations and commands the tractor 100 to: stop hydraulic flow to the tailgate 21; stop tractor ground speed; and stop PTO operations.

The operator, via the tractor operator interface 225, may be informed of various system states during the baling and bale ejection process, as follows: 0—Disabled; 1—Calibration driving tailgate 21 up; 2—Calibration up stopped; 3—Calibration driving tailgate 21 down; 4—baler controller 210 monitoring wrap actuator for bale full indication; 5—baler controller 210 commanding tractor speed stop; 6—bale ejection start opening; 7—bale ejection opening max up rate (during this state, the PTO control value is used to count down and shut off the PTO; 8—bale ejection opening slowing down to top position; 9—bale ejection delaying at the top of the sequence (this is an optional state); 10—bale ejection start closing; 11—bale ejection closing max down rate; 12—bale ejection closing slowing down to latch engagement rate and latching (this may also command tractor speed go, and will engage the PTO); and 13—baler controller 210 commanding tractor speed go (the speed go setting may also occur at state 12). This numerical sequence is used to inform the operator of the state of the system 200. Other identifiers may also be used.

Figure 5A:
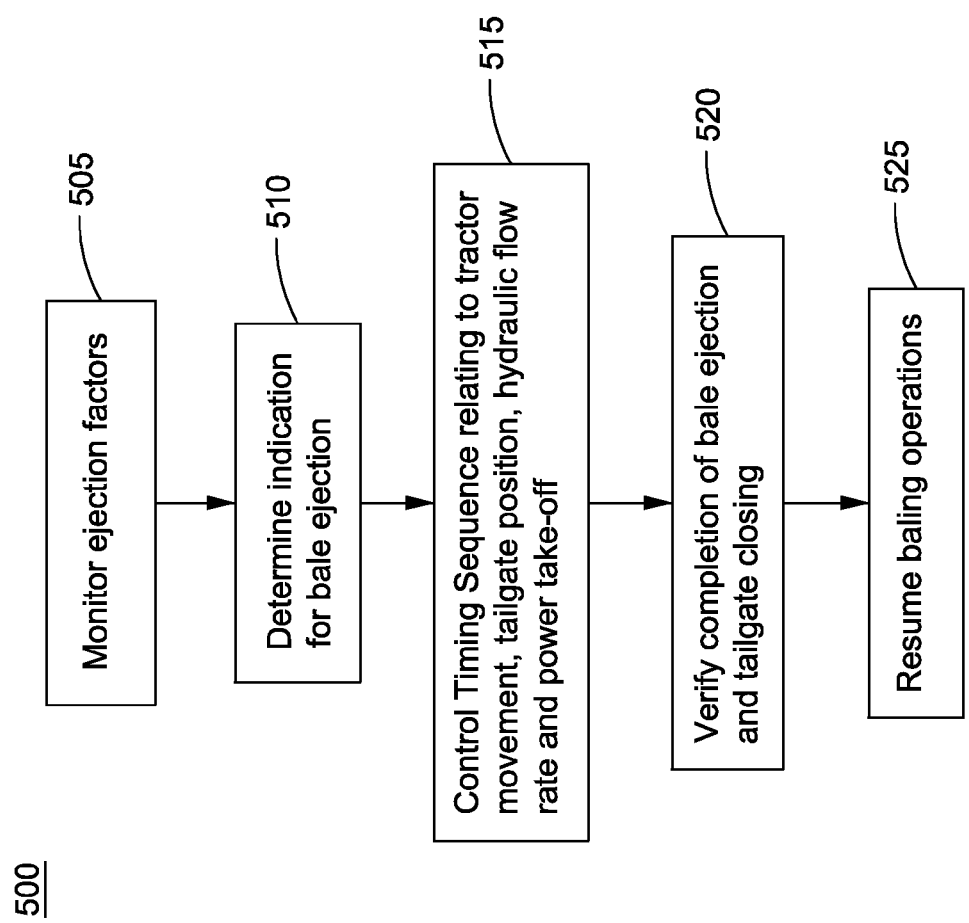
FIGS. 5A and 5B are flowcharts illustrating a method of a bale ejection sequence, according to embodiments.

FIG. 5A is a flowchart illustrating a method 500 of a bale ejection sequence, according to an embodiment. At 505, ejection factors are monitored by the baler controller 210. The monitored ejection factors may include one or more of a size of the bale 202 (as determined by sensors), a wrapping process of the bale, and a ground speed of the tractor 100.

At 510, based upon the monitored ejection factors, an indication for bale ejection is determined. The indication for bale ejection may comprise a manual command from the operator. For example, if the baler controller 210 monitors that the speed of the tractor is below a minimum required ground speed or that the tractor 100 is stopped, and the operator observes that the bale wrapping process is completed, the operator may select a command on the tractor operator interface 225 to initiate bale ejection.

At 515, the baler controller 210 implements and controls a timing sequence relating to movement of the tractor 100, position of the tailgate 21, the hydraulic flow rate, and the tractor PTO. The timing sequence is described in greater detail with respect to FIG. 5B.

Once the timing sequence is implemented, at 520, the baler controller 210 verifies completion of the bale ejection and closing of the tailgate 21. This verification may be achieved through the latching mechanism 401 with the gate closed sensor 400, described above with reference to FIGS. 4A and 4B. At 525, baling operations are resumed.

Figure 5B:
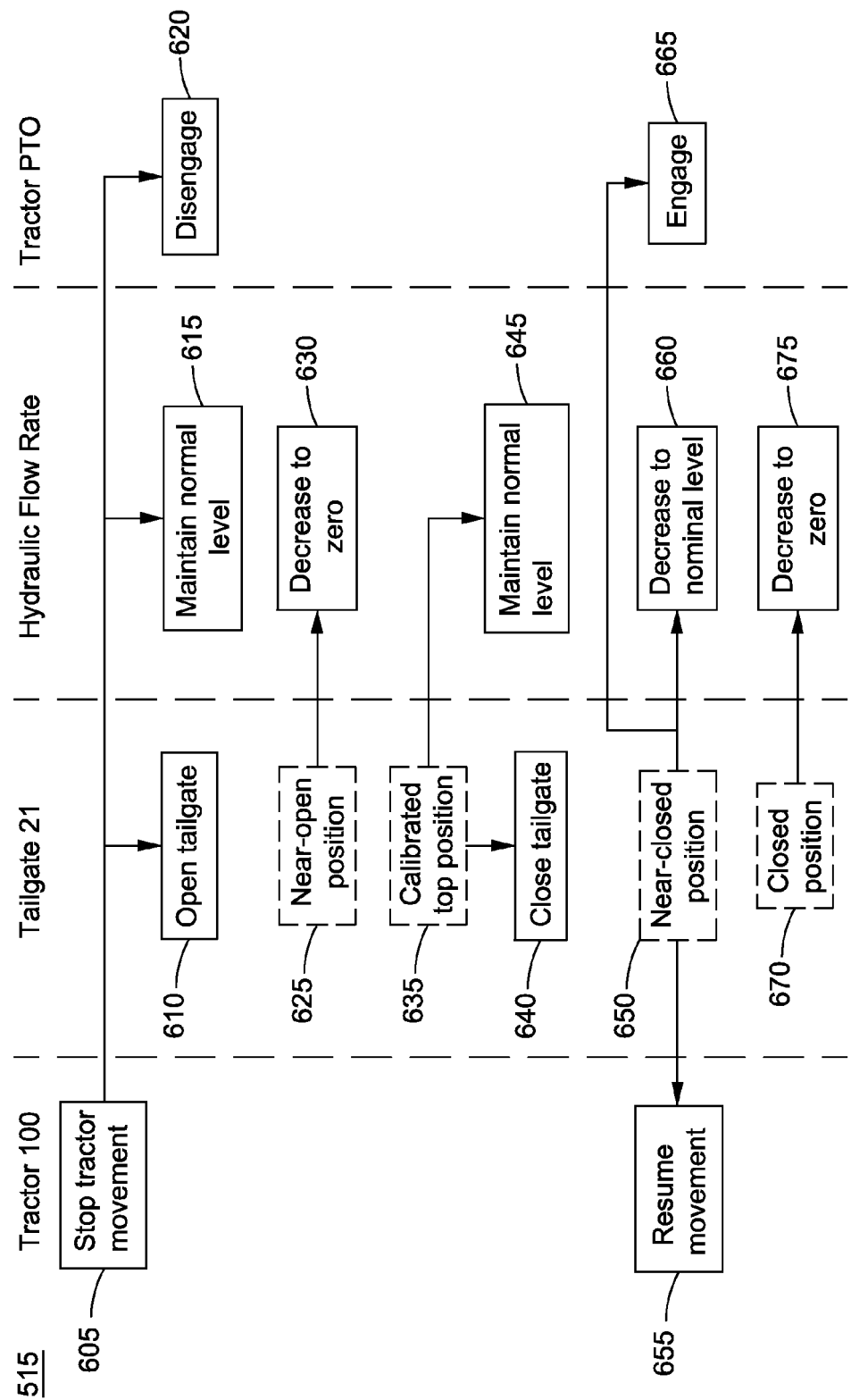

With reference to FIG. 5B, the timing sequence (515 of FIG. 5A) is illustrated. The timing sequence begins at 605 with an indication from the operator to commence bale ejection, which occurs after completion of bale wrapping. During the bale wrapping process, the tractor 100 stops movement. The tailgate 21 begins opening (610), the hydraulic flow rate is maintained at a normal level (615), and the tractor PTO is disengaged (620).

During the opening of the tailgate 21, the tailgate reaches a near-opened position (625). At this point, the hydraulic flow rate is decreased from the normal level to a reduced rate or to zero (630).

When the tailgate 21 reaches the calibrated top position (635), the tailgate 21 beings to close (640) and the hydraulic flow rate is maintained at the normal level (645).

When the tailgate 21 reaches a near-closed position (650), the hydraulic flow rate decreases from the normal level to a nominal level (655) and the tractor PTO is engaged (660). In one embodiment, when the tailgate reaches the near-closed position (at 650), the tractor 100 may resume movement (665).

The tailgate 21 continues to close until it reaches a closed or bottom position (670). When the tailgate 21 reaches the closed position, the hydraulic flow rate decreases from the nominal level to zero (675). According to one embodiment, the tractor 100 resumes movement when the tailgate 21 is fully closed (680).

The controllers 210 and 220 may be one or more processing devices, computing devices, processors, or the like for performing calculations and operations described herein. The controllers 210 and 220 interface with one another and the tractor operator interface 225, as well as with components of the baler 10 and the tractor 100, and may also interface with one or more memory devices (not shown) such as read only memory (ROM), random access memory (RAM), and one or more optional non-transitory memory devices such as, for example, an external or internal DVD drive, a CD ROM drive, a hard drive, flash memory, a USB drive, or the like. The memory devices may be configured to include individual files and/or one or more databases for storing any software modules, instructions, or data.

Program instructions, software, or interactive modules for performing any of the functional steps associated with the processes as described above may be stored in the ROM and/or the RAM. Optionally, the program instructions may be stored on a tangible computer readable medium such as a compact disk, a digital disk, flash memory, a memory card, a USB drive, an optical disc storage medium, such as a Blu-ray™ disc, and/or other recording medium.

A display interface may permit information from the controllers 210 and 220 to be displayed on the tractor operator interface 225, as well as other displays such as remote displays, in audio, visual, graphic, and/or alphanumeric format. Communication with external devices may occur using various communication ports that may be attached to one or more communications networks, such as the Internet or a local area network, or directly to a portable computing device such as a notebook computer. An interface may allow for receipt of data from input devices such as a keyboard, a mouse, a joystick, a touch screen, a remote control, a pointing device, a video input device, an audio input device, and the like.

Although the present invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

We claim:

1. A method of performing a bale ejection sequence to eject a bale from a baler, the baler comprising a baling chamber with a tailgate in a rear section of the baling chamber, the tailgate moveable between a closed position and an open position, the baler further comprising a hydraulic system connected to the tailgate to move the tailgate between the closed position and the open position, and a controller connected to a flow valve to control a flow of fluid to the hydraulic system a, the method comprising:
   determining, by the controller, an indication for bale ejection of the bale;
   upon determination of the indication for bale ejection, controlling, by the controller, a timing sequence relating to a position of the tailgate and a hydraulic flow rate of the fluid to the hydraulic system, wherein the timing sequence comprises:
      opening the tailgate while maintaining the hydraulic flow rate at a normal level;
      when the tailgate is approaching a near-opened position, proportionately decreasing the hydraulic flow rate from the normal level to a reduced rate;
      when the tailgate reaches a calibrated top position, closing the tailgate while maintaining the hydraulic flow rate at a normal level; and
      when the tailgate is approaching a near-closed position, proportionately decreasing the hydraulic flow rate from the normal level to a nominal level;
   wherein the timing sequence is based on a calibration of a cycle timing of the tailgate.

2. The method of claim 1, further comprising:
   monitoring, by the controller, ejection factors, wherein the ejection factors comprise one or more of a size of the bale, a wrapping process of the bale, and a ground speed of a tractor connected to the baler.

3. The method of claim 2, wherein the indication for bale ejection of the bale comprises a manual command from the operator based upon the monitored ejection factors.

4. The method of claim 1, further comprising:
   during the timing sequence of opening the tailgate while maintaining the hydraulic flow rate at a normal level, disengaging power take-off from a tractor to the baler by the controller.

5. The method of claim 4, further comprising:
   during the timing sequence of when the tailgate is approaching a near-closed position, engaging power take-off from a tractor to the baler by the controller.

6. The method of claim 1, further comprising:
   verifying, by the controller via a gate switch sensor coupled to the tailgate and in communication with the controller, when the tailgate reaches a closed position; and
   upon verification of the closed position, decreasing, by the controller, the hydraulic flow rate from the nominal level to zero.

7. The method of claim 1, wherein the timing sequence controlled by the controller further relates to movement of a tractor connected to the baler, the timing sequence further comprising:
   resuming movement of the tractor at one of (i) when the tailgate is approaching the near-closed position or (ii) when the tailgate reaches a closed position.

8. The method of claim 1, wherein the calibration of a cycle timing of the tailgate is based on one or more of: engine RPM of a tractor connected to the baler; the hydraulic system; a target maximum hydraulic speed at opening of the tailgate; a target maximum hydraulic speed at closing of the tailgate; inertia and momentum of the tailgate; and ejection push by the bale leaving the baling chamber.

9. The method of claim 8, wherein the controller calculates an anticipated tailgate opening time and an anticipated tailgate closing time based on one or more of the calibration timing, hydraulic rates, the target maximum hydraulic rates, and aggression rates.

10. The method of claim 9, wherein a determination relating to the tailgate approaching a near-opened position is based upon the anticipated tailgate opening time; and wherein a determination relating to the tailgate approaching a near-closed position is based on the anticipated tailgate closing time.

11. The method of claim 1, further comprising:
    monitoring, by the controller, a power take-off (PTO) torque value of a tractor connected to the baler;
    if the PTO torque value exceeds a predetermined value, disengaging power take-off from the tractor to the baler by the controller.

12. The method of claim 1, further comprising:
    upon receipt of a manual stop command from an operator via the operator interface, disabling, by the controller, one or more of: hydraulic flow to the tailgate, tractor movement, and power take-off (PTO) operations of the tractor.

13. A baler control system for a baler for performing a bale ejection sequence to eject a bale from the baler, the baler comprising a baling chamber with a tailgate in a rear section of the baling chamber, the tailgate moveable between a closed position and an open position, the baler further comprising a hydraulic system connected to the tailgate to move the tailgate between the closed position and the open position, the baler control system comprising:
    a controller coupled to the baler and connected to a flow valve to control a flow of fluid to the hydraulic system, the controller configured to
       determine an indication for bale ejection of the bale; and
       implement a timing sequence relating to a position of the tailgate and a hydraulic flow rate of the fluid to the hydraulic system, wherein the timing sequence comprises: (i) opening the tailgate while maintaining the hydraulic flow rate at a normal level; (ii) when the tailgate is approaching a near-opened position, proportionately decreasing the hydraulic flow rate from the normal level to zero; (iii) when the tailgate reaches a calibrated top position, closing the tailgate while maintaining the hydraulic flow rate at a normal level; and (iv) when the tailgate is approaching a near-closed position, proportionately decreasing the hydraulic flow rate from the normal level to a nominal level sufficient for engaging a tailgate close latching mechanism; and
    an operator interface coupled to the controller, the operator interface configured to display one or more of: factors relating to the indication for bale ejection of the bale and information relating to the timing sequence;
    wherein the timing sequence is based on a calibration of a cycle timing of the tailgate.

14. The baler control system of claim 13, wherein the controller is further configured to monitor the factors relating to the indication for bale ejection, the factors comprising one or more of a size of the bale, a wrapping process of the bale, and a ground speed of a tractor connected to the baler.

15. The baler control system of claim 14, wherein the indication for bale ejection of the bale comprises a manual command from the operator based upon the monitored factors, the manual command entered via the operator interface.

16. The baler control system of claim 13, wherein the controller is further configured to:
during the timing sequence of opening the tailgate while maintaining the hydraulic flow rate at a normal level, disengaging power take-off from tractor to the baler; and
during the timing sequence of when the tailgate is approaching a near-closed position, engaging power take-off from the tractor to the baler.

17. The baler control system of claim 13, further comprising:
a gate switch sensor coupled to the tailgate and in communication with the controller;
wherein the controller is further configured to verify, by a signal received from the gate switch sensor, when the tailgate reaches a closed position; and upon verification of the closed position, decrease the hydraulic flow rate from the nominal level to zero.

18. The baler control system of claim 13, wherein the timing sequence controlled by the controller further relates to movement of a tractor connected to the baler, the timing sequence further comprising:
resuming movement of the tractor at one of (i) when the tailgate is approaching the near-closed position or (ii) when the tailgate reaches a closed position.

19. The baler control system of claim 13, wherein the calibration of a cycle timing of the tailgate is based on one or more of: engine RPM of a tractor connected to the baler; the hydraulic system; a target maximum hydraulic speed at opening of the tailgate; a target maximum hydraulic speed at closing of the tailgate; inertia and momentum of the tailgate; and ejection push by the bale leaving the baling chamber.

20. The baler control system of claim 19, wherein the controller is further configured to calculate an anticipated tailgate opening time and an anticipated tailgate closing time based on one or more of the calibration timing, hydraulic rates, the target maximum hydraulic rates, and aggression rates.

21. The baler control system of claim 20, wherein a determination relating to the tailgate approaching a near-opened position is based upon the anticipated tailgate opening time; and wherein a determination relating to the tailgate approaching a near-closed position is based on the anticipated tailgate closing time.

22. The baler control system of claim 13, wherein the controller is further configured to monitor a power take-off (PTO) torque value of a tractor connected to the baler; and, if the PTO torque value exceeds a predetermined value, disengage power take-off from the tractor to the baler.

23. The baler control system of claim 13, wherein the controller is further configured to, upon receipt of a manual stop command from an operator via the operator interface, disable one or more of: hydraulic flow to the tailgate, tractor movement, and power take-off (PTO) operations of a tractor connected to the baler.

\* \* \* \* \*